(12) United States Patent
Lin

(10) Patent No.: US 8,330,283 B2
(45) Date of Patent: Dec. 11, 2012

(54) UNDERGROUND GENERATING DEVICE THAT IS ROLLED OR RUN OVER BY CARS SO AS TO PROVIDE A GENERATING EFFECT

(76) Inventor: Ming-Sheng Lin, Fengshan (TW)

( * ) Notice: Subject to any disclaimer, the term of this patent is extended or adjusted under 35 U.S.C. 154(b) by 491 days.

(21) Appl. No.: 12/728,424

(22) Filed: Mar. 22, 2010

(65) Prior Publication Data

US 2011/0227348 A1 Sep. 22, 2011

(51) Int. Cl.
*F03G 3/00* (2006.01)
(52) U.S. Cl. ........................................................ 290/1 R
(58) Field of Classification Search ..................... 290/1 R
See application file for complete search history.

(56) References Cited

U.S. PATENT DOCUMENTS

| | | | | |
|---|---|---|---|---|
| 7,102,244 B2* | 9/2006 | Hunter, Jr. | ..................... | 290/1 R |
| 7,432,607 B2* | 10/2008 | Kim et al. | ..................... | 290/1 R |
| 7,589,428 B2* | 9/2009 | Ghassemi | ..................... | 290/1 R |
| 7,988,077 B2* | 8/2011 | Lin | ................................ | 241/30 |
| 2011/0026203 A1* | 2/2011 | Ligtenberg et al. | ...... | 361/679.01 |

\* cited by examiner

*Primary Examiner* — Tho D Ta
(74) *Attorney, Agent, or Firm* — Alan Kamrath; Kamrath IP Lawfirm, PA

(57) ABSTRACT

An underground generating device includes a housing, a coil assembly mounted in the housing, and a core assembly movably mounted in the housing. The coil assembly includes a coil seat, a plurality of mounting tubes mounted in the coil seat and a plurality of induction coil sets mounted on each of the mounting tubes. The core assembly includes a plurality of cores movably mounted in the mounting tubes, a plurality of magnetic disks mounted on each of the cores, and a driven piece located outside of the housing and connected with the cores. Thus, when the driven piece is pressed intermittently, the magnetic disks are moved to pass through the induction coil sets reciprocally to change the magnetic field between the magnetic disks and the induction coil sets so that the induction coil sets produce an induction current to provide a generating effect.

12 Claims, 5 Drawing Sheets

US 8,330,283 B2

UNDERGROUND GENERATING DEVICE THAT IS ROLLED OR RUN OVER BY CARS SO AS TO PROVIDE A GENERATING EFFECT

BACKGROUND OF THE INVENTION

1. Field of the Invention

The present invention relates to a generating device and, more particularly, to an underground generating device.

2. Description of the Related Art

A wheeled vehicle, such as a car and the like, usually uses a battery to convert an electrical energy into a kinetic energy so that the wheeled vehicle can be driven by the kinetic energy so as to move on the road. However, the conventional wheeled vehicle only consumes the natural energy and cannot provide a generating function, thereby causing consumption of the energy.

BRIEF SUMMARY OF THE INVENTION

In accordance with the present invention, there is provided a generating device, comprising a housing having an inner portion formed with a receiving space, a coil assembly mounted in the receiving space of the housing, and a core assembly movably mounted in the receiving space of the housing and movable relative to the coil assembly to produce a magnetic interaction between the core assembly and the coil assembly. The coil assembly includes a hollow coil seat mounted in the receiving space of the housing, a plurality of upright mounting tubes mounted in the coil seat and a plurality of induction coil sets mounted on each of the mounting tubes and received in the coil seat. The core assembly includes a plurality of upright cores movably mounted in the mounting tubes of the coil assembly respectively and aligning with the induction coil sets on each of the mounting tubes, a plurality of magnetic disks mounted on each of the cores to move in concert with each of the cores and movable to pass through the induction coil sets on each of the mounting tubes to produce a magnetic interaction between the magnetic disks of the core assembly and the induction coil sets of the coil assembly, an upper stop plate movably mounted in the receiving space of the housing and connected with upper ends of the cores to move the cores, and a driven piece located outside of the housing and connected with the upper stop plate to move the upper stop plate.

The primary objective of the present invention is to provide an underground generating device that is rolled or run over by cars so as to provide a generating effect.

According to the primary objective of the present invention, when the driven piece is pressed intermittently by an external force, the magnetic disks are moved downward and upward to pass through the induction coil sets reciprocally so as to change the magnetic field between the magnetic disks and the induction coil sets so that the induction coil sets can produce an induction current which is collected and stored successively so as to provide a generating effect.

According to another objective of the present invention, the generating device is mounted in the ground of a road to be rolled by cars intermittently so that the generating device can change the kinetic energy into an electrical energy to provide a generating effect so as to reuse the energy efficiently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
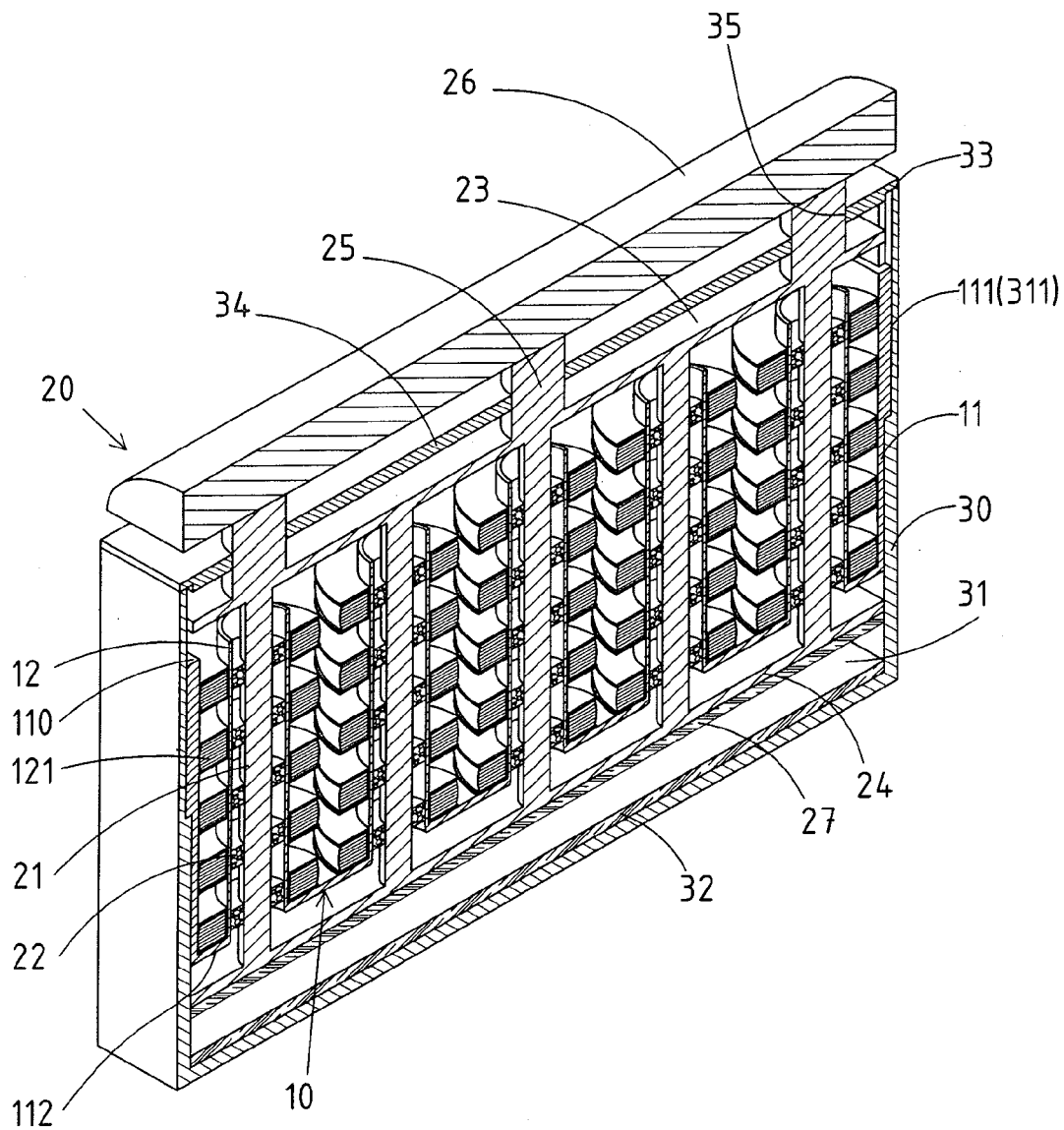
FIG. 1 is a partially broken perspective cross-sectional view of a generating device in accordance with the preferred embodiment of the present invention.

Referring to the drawings and initially to FIGS. 1-4, a generating device in accordance with the preferred embodiment of the present invention comprises a housing 30 having an inner portion formed with a receiving space 31, a coil assembly 10 mounted in the receiving space 31 of the housing 30, and a core assembly 20 movably mounted in the receiving space 31 of the housing 30 and movable relative to the coil assembly 10 to produce a magnetic interaction between the core assembly 20 and the coil assembly 10.

The housing 30 has two opposite sidewalls each provided with an upright guide track 311 connected to the receiving space 31 of the housing 30. A top cover 34 is mounted on an open top portion 33 of the housing 30 and has a surface formed with a plurality of through holes 35 connected to the receiving space 31 of the housing 30. A first strong magnet 32 is mounted in the receiving space 31 of the housing 30 and abuts a bottom of the housing 30.

The coil assembly 10 includes a hollow coil seat 11 mounted in the receiving space 31 of the housing 30, a plurality of upright mounting tubes 12 mounted in the coil seat 11 and a plurality of induction coil sets 121 mounted on each of the mounting tubes 12 and received in the coil seat 11. The coil seat 11 of the coil assembly 10 is fully in the receiving space 31 of the housing 30 and is located under and spaced from the top cover 34. The coil seat 11 of the coil assembly 10 has two opposite sidewalls each provided with an upright guide rail 111 secured in the guide track 311 of the housing 30. The induction coil sets 121 of the coil assembly 10 are connected with a load or an electric storage equipment (not shown).

The core assembly 20 partially protrudes outwardly from the housing 30 and the top cover 34 and includes a plurality of upright cores 21 movably mounted in the mounting tubes 12 of the coil assembly 10 respectively and aligning with the induction coil sets 121 on each of the mounting tubes 12, a plurality of magnetic disks 22 mounted on each of the cores 21 to move in concert with each of the cores 21 and movable to pass through the induction coil sets 121 on each of the mounting tubes 12 to produce a magnetic interaction between the magnetic disks 22 of the core assembly 20 and the induction coil sets 121 of the coil assembly 10, an upper stop plate 23 movably mounted in the receiving space 31 of the housing 30 and connected with upper ends of the cores 21 to move the cores 21, a driven piece 26 located outside of the housing 30 and connected with the upper stop plate 23 to move the upper stop plate 23, a plurality of guide posts 25 mounted between the driven piece 26 and the upper stop plate 23, a lower stop plate 24 movably mounted in the receiving space 31 of the housing 30 and connected with lower ends of the cores 21 to move in concert with the cores 21, and a second strong magnet 27 mounted on a bottom of the lower stop plate 24 to move in concert with the lower stop plate 24 and located above and spaced from the first strong magnet 32.

The second strong magnet 27 of the core assembly 20 is movably mounted in the receiving space 31 of the housing 30. The second strong magnet 27 of the core assembly 20 has a polarity opposite to that of the first strong magnet 32 to produce a repulsive force between the second strong magnet 27 of the core assembly 20 and the first strong magnet 32 when the second strong magnet 27 of the core assembly 20 is movable toward the first strong magnet 32. The cores 21 of the core assembly 20 are located between the upper stop plate 23 and the lower stop plate 24 of the core assembly 20 so that the mounting tubes 12 of the coil assembly 10 are located between the upper stop plate 23 and the lower stop plate 24 of the core assembly 20. The guide posts 25 of the core assembly 20 are movably mounted in the through holes 35 of the top cover 34 respectively. Each of the guide posts 25 of the core assembly 20 has an upper end connected with a bottom of the driven piece 26 and a lower end connected with a top of the upper stop plate 23. The upper stop plate 23 of the core assembly 20 is movable between a bottom of the top cover 34 and an open top portion 110 of the coil seat 11. The lower stop plate 24 of the core assembly 20 is movable between a bottom portion 112 of the coil seat 11 and the first strong magnet 32.

Figure 2:
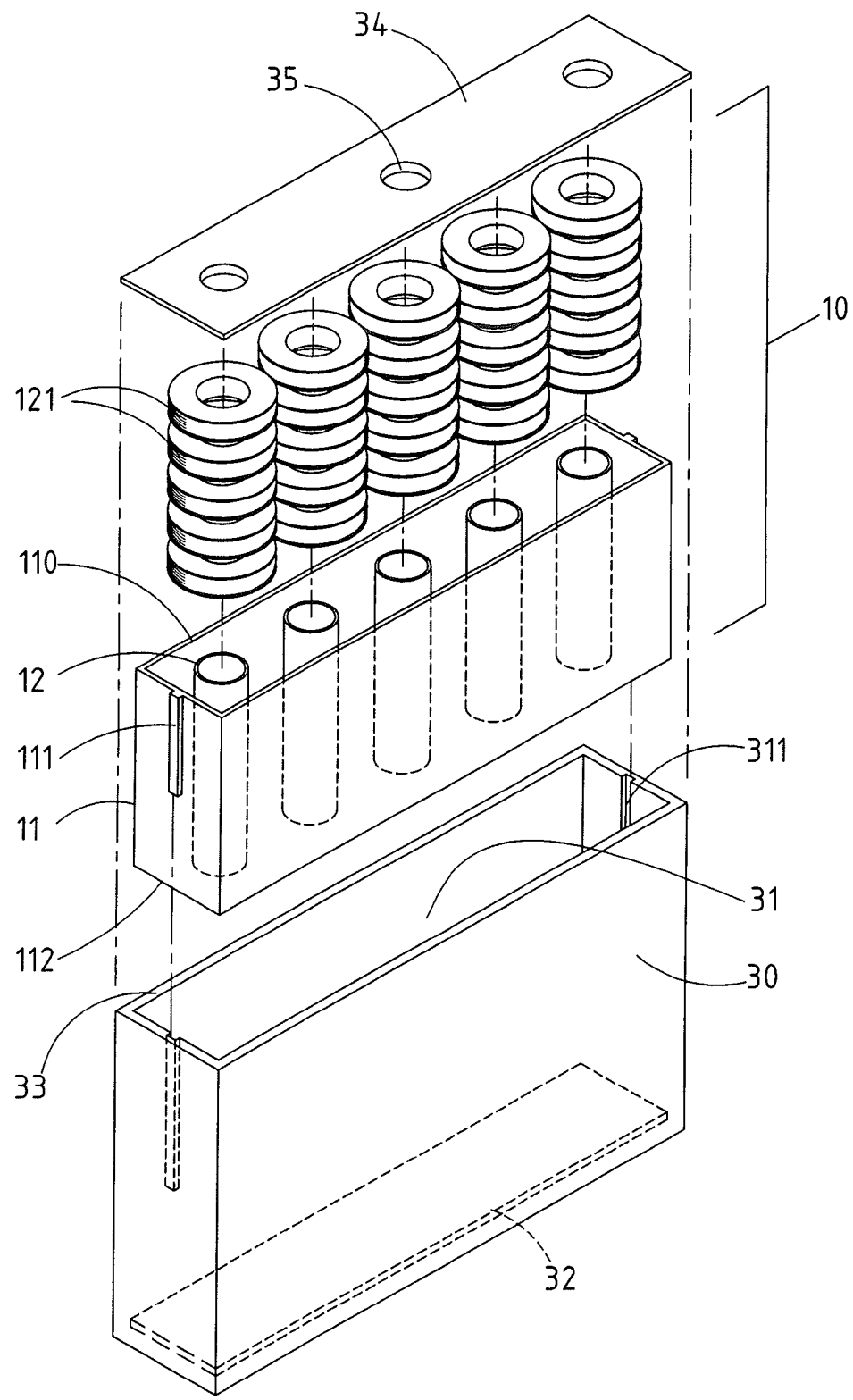
FIG. 2 is a partially exploded perspective view of the generating device as shown in FIG. 1.
Figure 3:
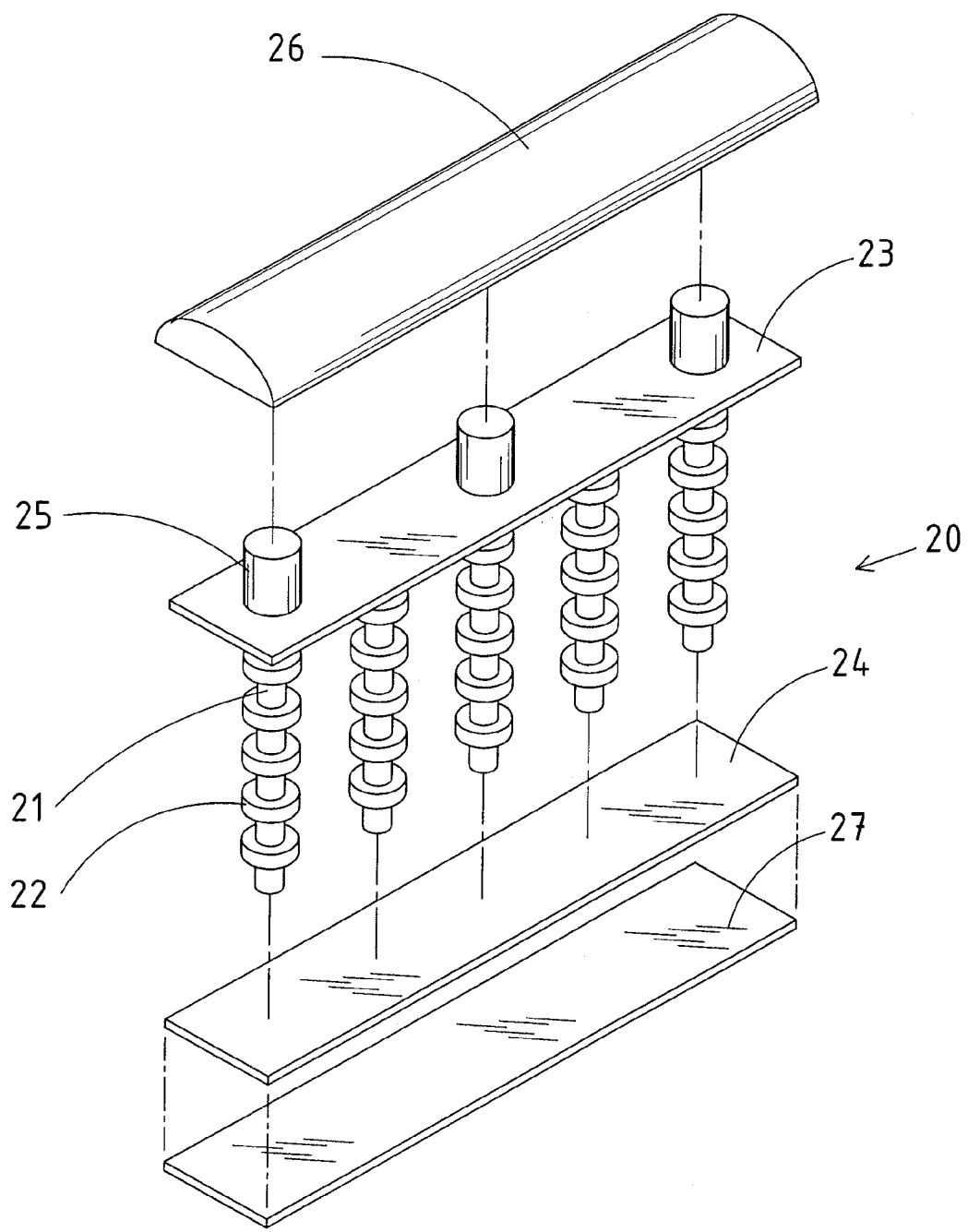
FIG. 3 is a partially exploded perspective view of the generating device as shown in FIG. 1.
Figure 4:
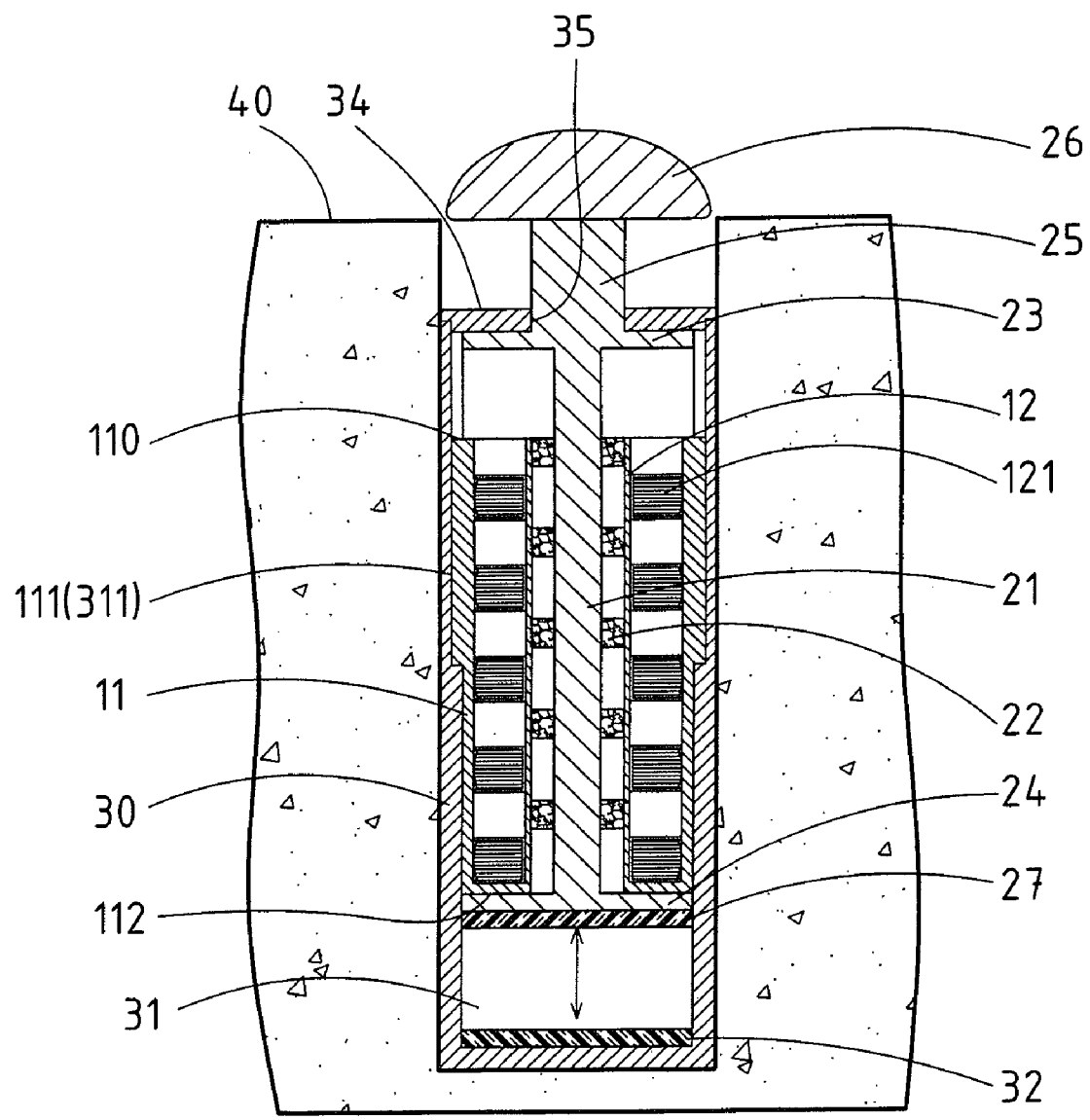
FIG. 4 is a side cross-sectional view of the generating device as shown in FIG. 1.
Figure 5:
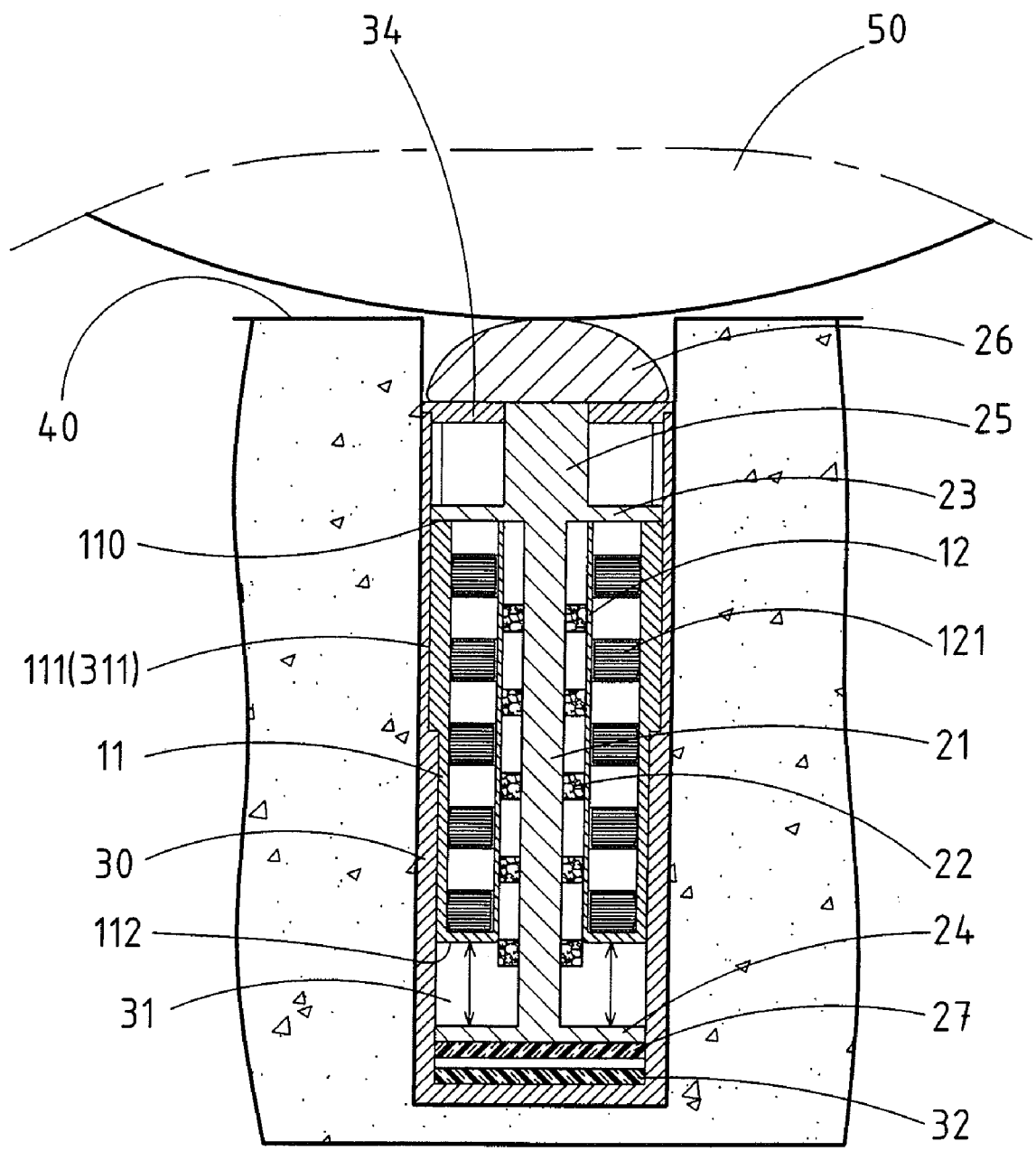
FIG. 5 is a schematic operational view of the generating device as shown in FIG. 4.

In operation, referring to FIGS. 4 and 5 with reference to FIGS. 1-3, when the generating device is mounted in the ground 40, the core assembly 20 is pushed upward by the repulsive force between the second strong magnet 27 and the first strong magnet 32 so that the driven piece 26 is moved upward to protrude outwardly from the ground 40 as shown in FIG. 4. In such a manner, when a car tire 50 rolls or runs over the ground 40 and the driven piece 26, the driven piece 26 is pressed downward as shown in FIG. 5 to press the upper stop plate 23 which presses the cores 21 which moves the magnetic disks 22 downward so that the magnetic disks 22 are moved downward to pass through the induction coil sets 121. After the force applied on the driven piece 26 disappears, the second strong magnet 27 is pushed upward by the repulsive force between the second strong magnet 27 and the first strong magnet 32 to push the lower stop plate 24 which pushes the cores 21 which moves the magnetic disks 22 upward so that the magnetic disks 22 are moved upward to pass through the induction coil sets 121, and the driven piece 26 is moved upward to protrude outwardly from the ground 40 as shown in FIG. 4. Thus, when the driven piece 26 is rolled and pressed intermittently, the magnetic disks 22 are moved downward and upward to pass through the induction coil sets 121 reciprocally so as to change the magnetic field between the magnetic disks 22 and the induction coil sets 121 so that the induction coil sets 121 produce an induction current which is collected and stored successively so as to provide a generating effect.

Accordingly, when the driven piece 26 is pressed intermittently by an external force, the magnetic disks 22 are moved downward and upward to pass through the induction coil sets 121 reciprocally so as to change the magnetic field between the magnetic disks 22 and the induction coil sets 121 so that the induction coil sets 121 can produce an induction current which is collected and stored successively so as to provide a generating effect. In addition, the generating device is mounted in the ground of a road to be rolled by cars intermittently so that the generating device can change the kinetic energy into an electrical energy to provide a generating effect so as to reuse the energy efficiently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A generating device, comprising:
 a housing having an inner portion formed with a receiving space;
 a coil assembly mounted in the receiving space of the housing; and
 a core assembly movably mounted in the receiving space of the housing and movable relative to the coil assembly to produce a magnetic interaction between the core assembly and the coil assembly;
 wherein the coil assembly includes:
 a hollow coil seat mounted in the receiving space of the housing;
 a plurality of upright mounting tubes mounted in the coil seat; and a plurality of induction coil sets mounted on each of the mounting tubes and received in the coil seat;
 the core assembly includes:
 a plurality of upright cores movably mounted in the mounting tubes of the coil assembly respectively and aligning with the induction coil sets on each of the mounting tubes;
 a plurality of magnetic disks mounted on each of the cores to move in concert with each of the cores and movable to pass through the induction coil sets on each of the mounting tubes to produce a magnetic interaction between the magnetic disks of the core assembly and the induction coil sets of the coil assembly;
 an upper stop plate movably mounted in the receiving space of the housing and connected with upper ends of the cores to move the cores; and
 a driven piece located outside of the housing and connected with the upper stop plate to move the upper stop plate;
 wherein the generating device further comprises: a first strong magnet mounted in the receiving space of the housing and abutting a bottom of the housing; the core assembly further includes: a lower stop plate movably mounted in the receiving space of the housing and connected with lower ends of the cores to move in concert with the cores; a second strong magnet mounted on a bottom of the lower stop plate to move in concert with the lower stop plate and located above and spaced from the first strong magnet;
 wherein the first strong magnet and the second strong magnet of the core assembly have a polarity configuration to produce a repulsive force between the second strong magnet of the core assembly and the first strong magnet when the second strong magnet of the core assembly is movable toward the first strong magnet.

2. The generating device of claim 1, wherein
 the housing has two opposite sidewalls each provided with an upright guide track connected to the receiving space of the housing;
 the coil seat of the coil assembly has two opposite sidewalls each provided with an upright guide rail secured in the guide track of the housing.

3. The generating device of claim 1, wherein the cores of the core assembly are located between the upper stop plate and the lower stop plate of the core assembly; the mounting tubes of the coil assembly are located between the upper stop plate and the lower stop plate of the core assembly.

4. The generating device of claim 1, wherein the lower stop plate of the core assembly is movable between a bottom portion of the coil seat and the first strong magnet.

5. The generating device of claim 1, wherein the second strong magnet of the core assembly is movably mounted in the receiving space of the housing.

6. The generating device of claim 1, wherein the coil seat of the coil assembly is fully in the receiving space of the housing.

7. The generating device of claim 1, wherein the core assembly partially protrudes outwardly from the housing and the top cover.

8. The generating device of claim 1, wherein the core assembly further includes: a plurality of guide posts mounted between the driven piece and the upper stop plate.

9. The generating device of claim 8, wherein each of the guide posts of the core assembly has an upper end connected with a bottom of the driven piece and a lower end connected with a top of the upper stop plate.

10. The generating device of claim 8, wherein the generating device further comprises:
a top cover mounted on an open top portion of the housing and having a surface formed with a plurality of through holes connected to the receiving space of the housing;
the guide posts of the core assembly are movably mounted in the through holes of the top cover respectively.

11. The generating device of claim 10, wherein the upper stop plate of the core assembly is movable between a bottom of the top cover and an open top portion of the coil seat.

12. The generating device of claim 10, wherein the coil seat of the coil assembly is located under and spaced from the top cover.

* * * * *